United States Patent
Kazama

(10) Patent No.: US 6,637,806 B2
(45) Date of Patent: Oct. 28, 2003

(54) REAR SPOILER STRUCTURE FOR A VEHICLE

(75) Inventor: Satoshi Kazama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/267,734

(22) Filed: Oct. 10, 2002

(65) Prior Publication Data
US 2003/0071485 A1 Apr. 17, 2003

(30) Foreign Application Priority Data
Oct. 15, 2001 (JP) .................................... 2001-316150

(51) Int. Cl.⁷ .................................................. B60J 1/00
(52) U.S. Cl. ............................... 296/180.1; 296/180.5; 362/485
(58) Field of Search ............................... 296/180.1, 223, 296/91, 222, 180.5, 76, 146.1, 84.1, 146.2; 340/903; 241/169.2; 362/547, 484, 503, 493, 496; 428/210; 359/371

(56) References Cited

U.S. PATENT DOCUMENTS

| | | | | |
|---|---|---|---|---|
| 4,174,863 A | * | 11/1979 | Gotz ........................ 296/180.5 |
| 4,195,874 A | * | 4/1980 | Janssen et al. ........... 296/180.1 |
| 4,787,665 A | * | 11/1988 | Rich ........................ 296/180.1 |
| 4,819,132 A | * | 4/1989 | Hwan et al. ............. 296/180.1 |
| 4,845,600 A | * | 7/1989 | Matsumura et al. ........ 362/547 |
| 4,851,970 A | * | 7/1989 | Bronder ..................... 362/485 |
| 4,854,636 A | * | 8/1989 | Greenhalgh et al. ....... 296/84.1 |
| 4,886,312 A | * | 12/1989 | Asoh ........................ 296/146.2 |
| 4,896,136 A | * | 1/1990 | Hotovy ........................ 362/485 |
| 4,993,774 A | * | 2/1991 | Greenhalgh et al. ....... 296/84.1 |
| 5,356,195 A | * | 10/1994 | Kanda ....................... 296/180.1 |
| 5,410,455 A | * | 4/1995 | Hashimoto .................. 362/503 |
| 5,415,453 A | * | 5/1995 | Huber ....................... 296/180.1 |
| 5,560,701 A | * | 10/1996 | Payne ........................ 362/493 |
| 5,641,558 A | * | 6/1997 | Noda et al. ................. 428/210 |
| 5,678,884 A | * | 10/1997 | Murkett et al. .......... 296/180.1 |
| 5,700,080 A | * | 12/1997 | Okuda ........................ 362/496 |
| 5,845,960 A | * | 12/1998 | Koike et al. ............. 296/180.1 |
| 6,170,904 B1 | * | 1/2001 | Schaedlich et al. ...... 296/180.1 |
| 6,340,192 B2 | * | 1/2002 | Pike et al. ............... 296/180.1 |
| 6,431,639 B2 | * | 8/2002 | Yoon ........................ 296/180.1 |
| 2002/0105742 A1 | * | 8/2002 | Jeon et al. ................. 359/871 |

FOREIGN PATENT DOCUMENTS

| | | | |
|---|---|---|---|
| DE | 3116628 | * | 11/1982 |
| JP | 10-305787 | | 11/1998 |
| JP | 2000 219167 | * | 8/2000 |
| JP | 2002 29459 | * | 1/2002 |

* cited by examiner

*Primary Examiner*—Kiran Patel
(74) *Attorney, Agent, or Firm*—Sughrue Mion, PLLC

(57) ABSTRACT

In a rear spoiler structure for a vehicle in which a rear spoiler is provided at a rear deck of the vehicle, the rear spoiler is part of a rear glass plate provided at the rear deck of the vehicle, and is comprised of a protrusion that protrudes toward an outward of the vehicle and extends widthwise. The rear spoiler is provided with a depression inside the vehicle, and the depression accommodates a brake lamp. The rear spoiler structure needs no reinforcement for preventing the rear spoiler from loosening and rattling, so as to achieve a simplified construction, facilitates an electric wiring task when the brake lamp such as a high-mounted stop lamp is incorporated, and needs no weathertight sealing structure.

4 Claims, 5 Drawing Sheets

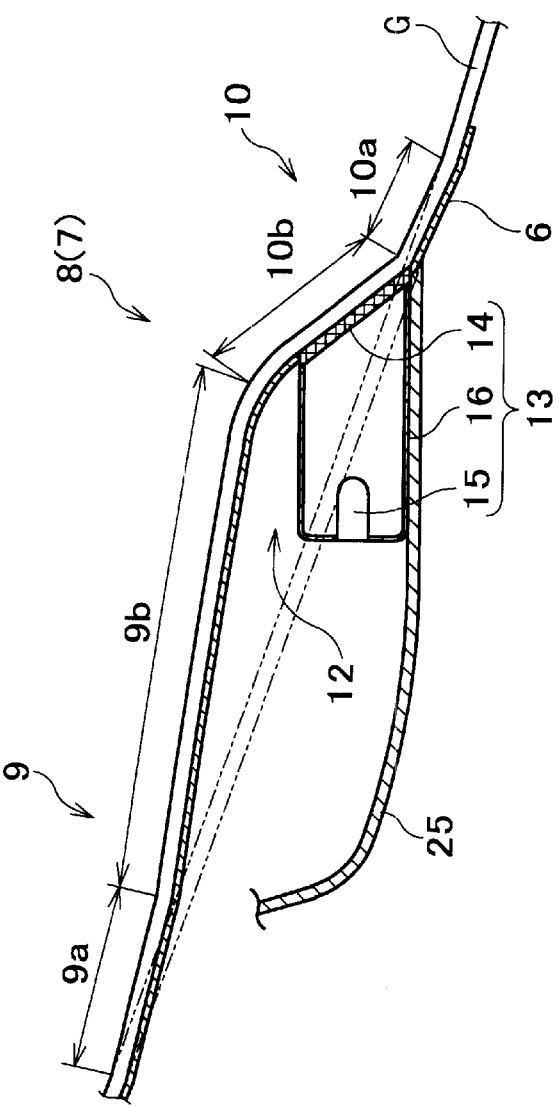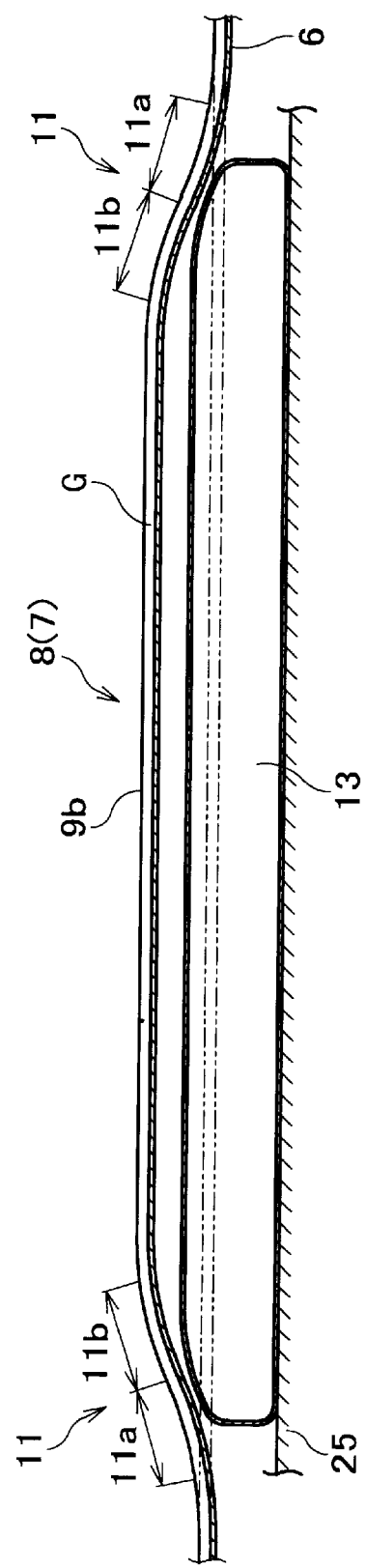
FIG.3A
FIG.3B

REAR SPOILER STRUCTURE FOR A VEHICLE

BACKGROUND OF THE INVENTION

This invention relates to a rear spoiler structure for a vehicle.

The rear spoiler is a baffle means provided at the rear of a vehicle for the purpose of controlling drag acting on the vehicle, reducing lift acting on the rear of the vehicle. Among conventional spoiler structures is such a widespread structure as disclosed in Japanese Laid-Open Patent Application, Publication No. 10-305787 A, which is implemented by fastening a rear spoiler on a vehicle body with a bolt. The rear spoiler mounted on the vehicle body with a bolt, which may incorporate a high-mounted stop lamp, is also known in the art.

However, the above structure requires a separate rear spoiler to be mounted on the vehicle body, and thus needs reinforcement for preventing the rear spoiler from loosening and rattling, which disadvantageously increases the complexity of its whole construction.

Moreover, the separate rear spoiler, if provided with a high-mounted stop lamp, entails a burdensome task of electric wiring for the high-mounted stop lamp, and necessitates a weathertight sealing structure, which disadvantageously increases the complexity of the whole construction as well.

The present invention is created in order to eliminate the above-described disadvantages.

SUMMARY OF THE INVENTION

It is an exemplified general object of the present invention to provide a rear spoiler structure for a vehicle that needs no reinforcement for preventing a rear spoiler from loosening and rattling, so as to achieve a simplified construction and facilitate an electric wiring task when a brake lamp such as a high-mounted stop lamp is incorporated, and needs no weathertight sealing structure.

According to one exemplified aspect of the present invention, there is provided a rear spoiler structure for a vehicle in which a rear spoiler is provided at a rear deck of the vehicle, wherein the rear spoiler is part of a rear glass plate provided at the rear deck of the vehicle, and is comprised of a protrusion that protrudes toward an outward of the vehicle and extends widthwise. This structure needs no reinforcement for preventing the rear spoiler from loosening and rattling, and thus serves to reduce the number of process steps (as well as man-hours) for mounting the rear spoiler. Moreover, a flush-surfaced external face of the vehicle is achieved and outward appearance thereof is beautifully improved.

According to yet another exemplified aspect of the present invention, the above rear spoiler is provided with a depression inside the vehicle, and the depression accommodates a brake lamp. This structure requires no electric wiring through the rear glass plate, thus facilitating the wiring task and requiring no weathertight seal structure. Since the brake lamp is provided in the depression, in-vehicle space can be effectively utilized.

According to yet another exemplified aspect of the present invention, the protrusion is formed at an upper end of the rear glass plate. This structure allows straightened-out airflow to flow over an external face of the rear glass plate, and can thus effectively remove raindrops, dust, or the like, which would otherwise be stuck on the external face of the rear glass plate. Consequently, visibility through the rear glass plate from the driver's seat can be kept excellent.

Further, according to yet another aspect of the present invention, a widthwise-faced end of the protrusion extending toward rearward of the vehicle is inclined inwardly widthwise. This structure serves to restrict wind noise at the widthwise-faced end, and to generate optimum airflow that is brought together and flows toward the rearward of the vehicle, thus reducing drag acting on the vehicle.

Other objects and further features of the present invention will become readily apparent from the following description of preferred embodiments with reference to accompanying drawings.

BRIEF DESCRIPTION OF THE DRAWINGS

FIG. 3A is a cross-sectional view taken along line A—A of FIG. 2A.

FIG. 3B is a cross-sectional view taken along line B—B of FIG. 2B.

DETAILED DESCRIPTION OF THE PREFERRED EMBODIMENTS

Figure 1:
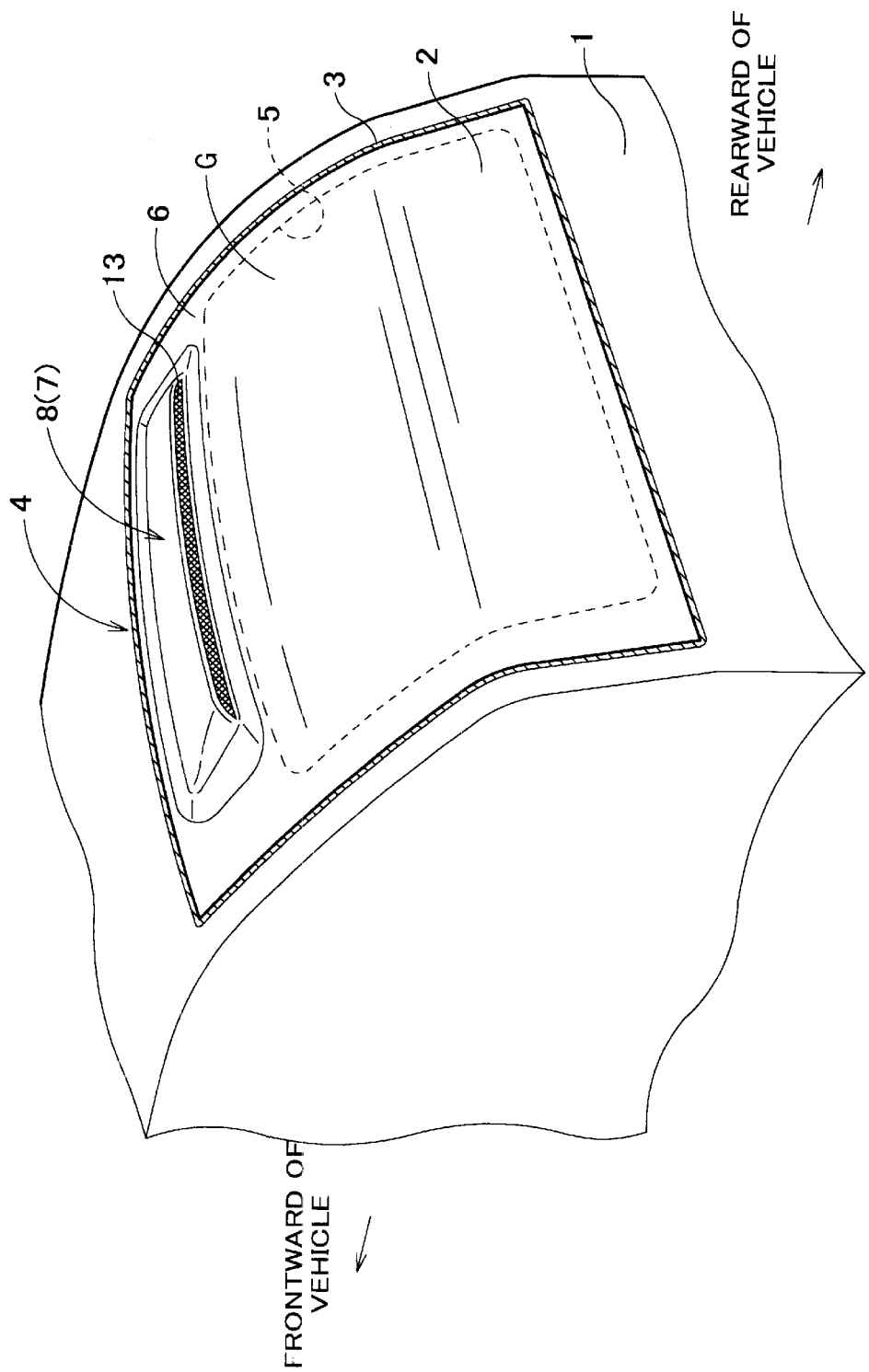
FIG. 1 is a perspective view showing an outward appearance of a rear spoiler structure.
Figure 2A:
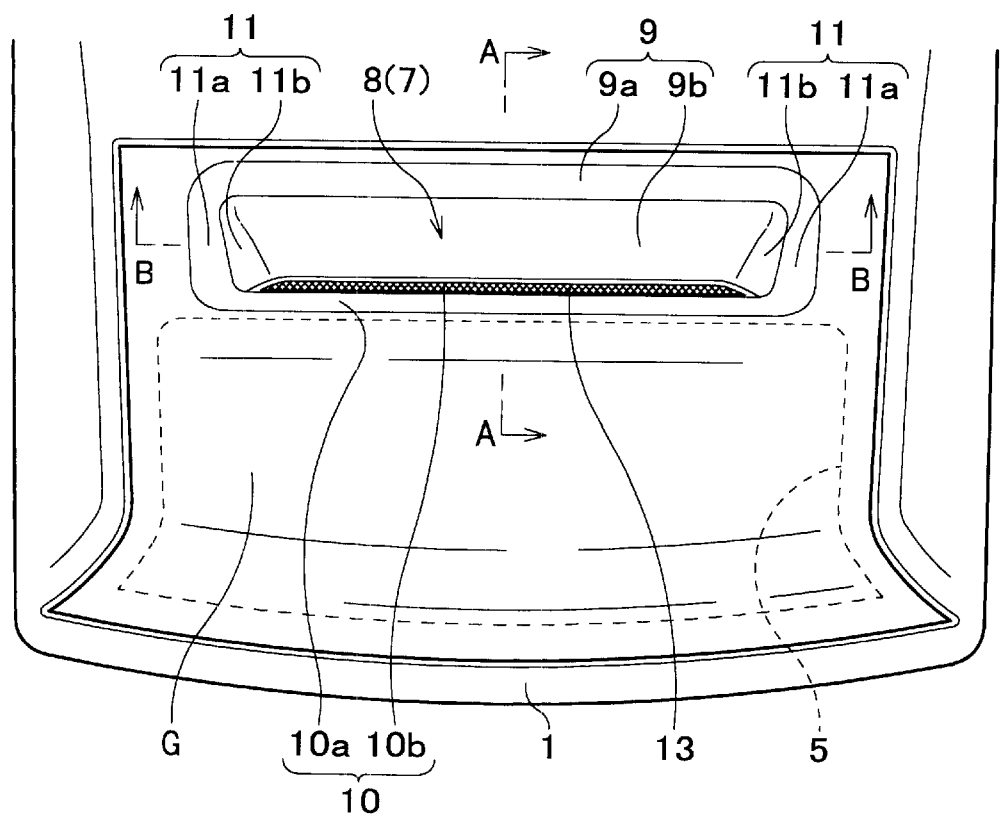
FIG. 2A is a top plan view of the rear spoiler structure.
Figure 2B:
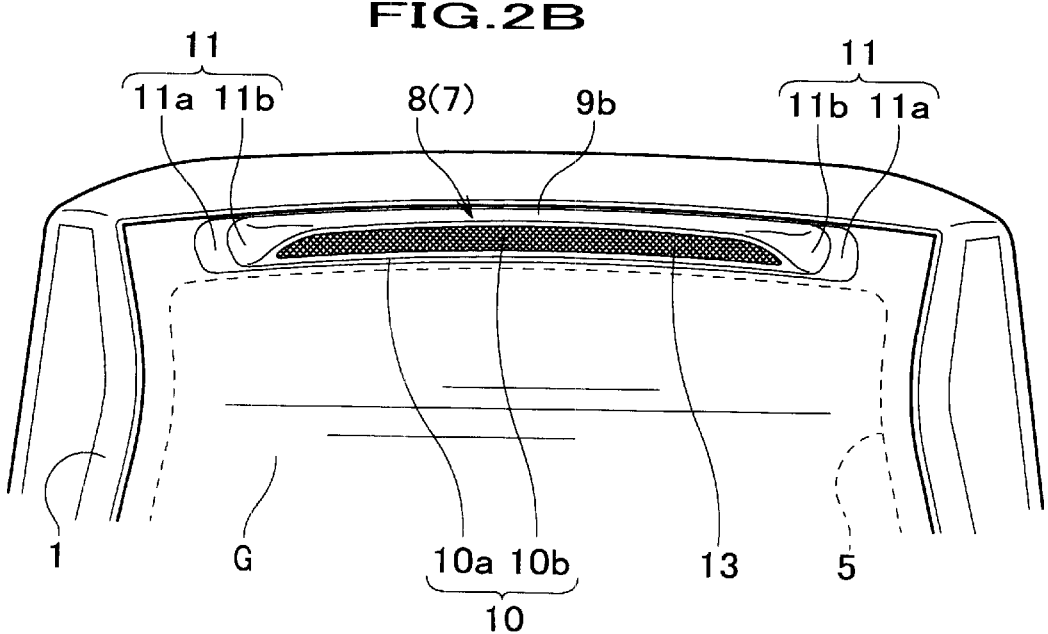
FIG. 2B is a rear elevational view (as viewed from the rear of the vehicle) of the rear spoiler structure.
Figure 4:
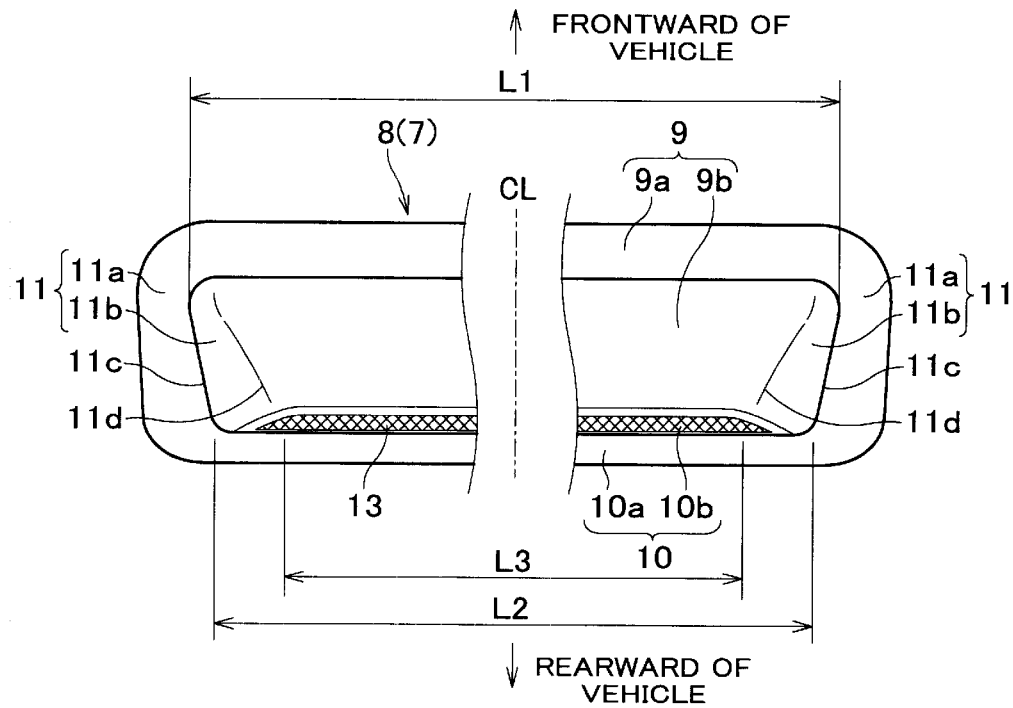
FIG. 4 is a top plan view of the rear spoiler structure for illustrating inclined ends of the rear spoiler in detail.
Figure 5:
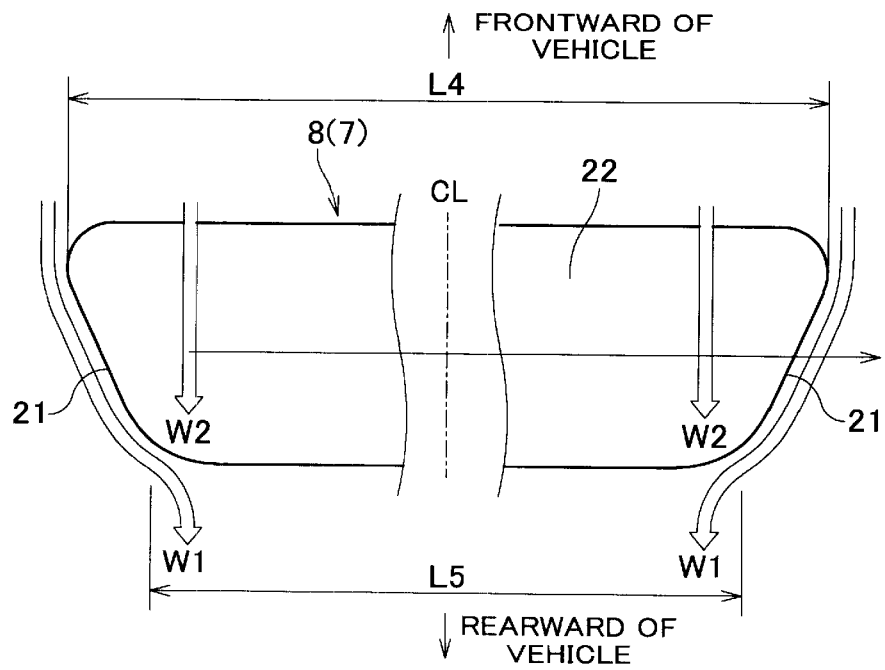
FIG. 5 is a top plan view of a variation of the rear spoiler structure for illustrating inclined ends of the rear spoiler in detail.
Figure 6:
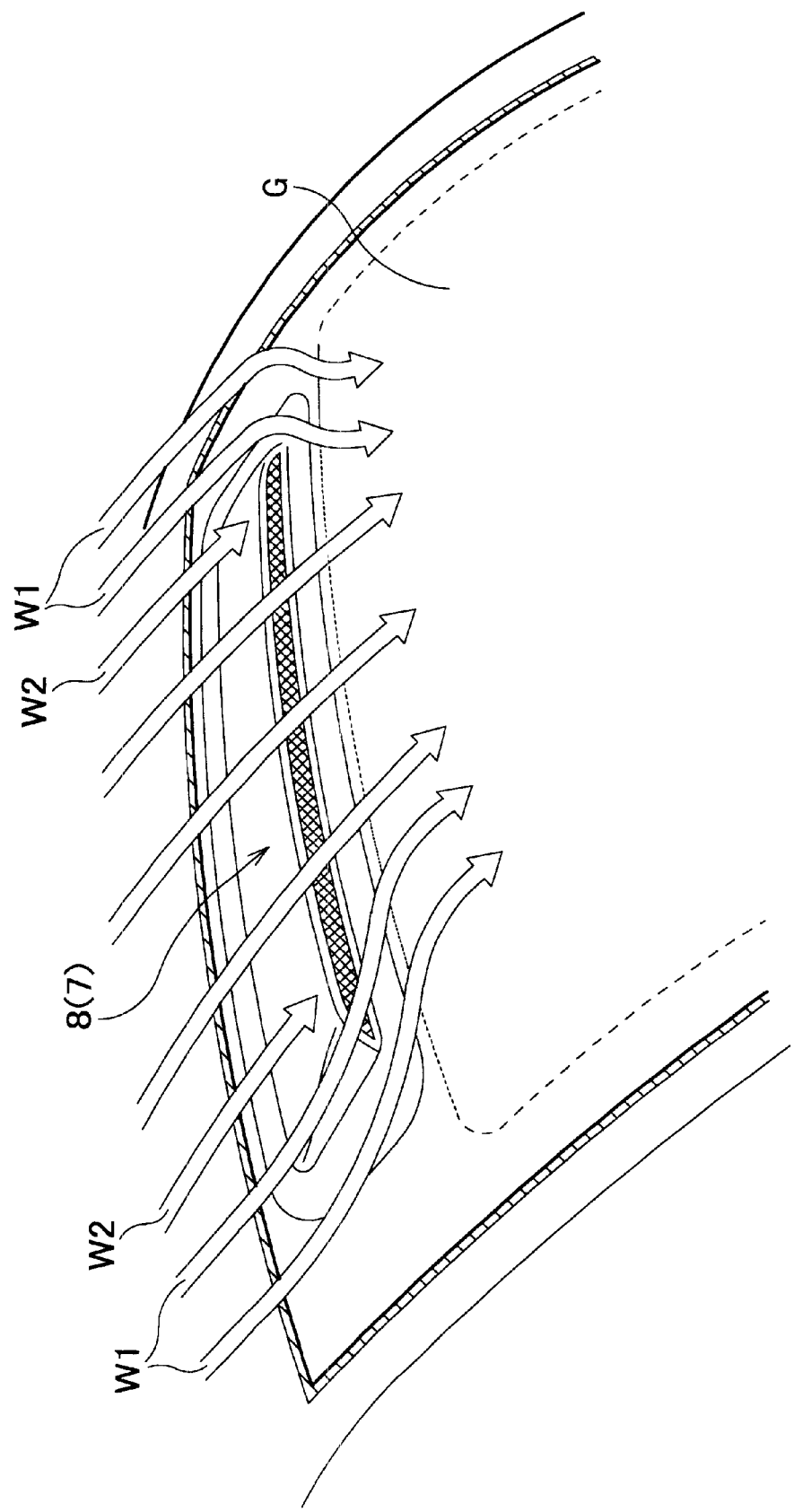
FIG. 6 is a perspective view for explaining the rear spoiler's operation of controlling airflow.

A description will be given of exemplified embodiments of the present invention with reference to the drawings. FIG. 1 is a perspective view showing an outward appearance of a rear spoiler structure. FIG. 2A is a top plan view of the rear spoiler structure, and FIG. 2B is a rear elevational view thereof (as viewed from the rear of a vehicle). FIG. 3A is a cross-sectional view taken along line A—A of FIG. 2A, and FIG. 3B is a cross-sectional view taken along line B—B of FIG. 2B. FIG. 4 is a top plan view of the rear spoiler structure for illustrating inclined ends of the rear spoiler in detail. FIG. 5 is a top plan view of a variation of the rear spoiler structure for illustrating inclined ends of the rear spoiler in detail. FIG. 6 is a perspective view for explaining the rear spoiler's operation of controlling airflow.

In FIGS. 1, 2A, and 2B, denoted by 1 is a rear deck of a vehicle body. The vehicle is a hatchback, in which a rear door 2 as a tailgate (section enclosed by hatched line 3) swings on pivots near an upper end 4 of the rear deck so as to open and close. The rear door 2 is an integrally formed pane of glass (the pane of glass facing the rear side of the vehicle is hereinafter referred to as a rear glass plate G). In the present embodiment, a dressed board 6, which is made of sheet steel or the like in which an opening 5 (indicated by a broken line in FIG. 1) is formed to insure a rear view, is attached at the back (the inside of the vehicle) of the rear glass plate G.

In some instances, the rear door 2 is constructed only of the rear glass plate G without being backed with the dressed board 6. The present invention is applicable not only to the vehicles using the rear glass plate G attached to the rear door 2 or the rear glass plate G alone forming the rear door 2, as long as the rear glass plate G is provided in the rear deck of the vehicle, but also to vehicles typically such as a sedan using the rear glass plate G immovably fitted in the vehicle body.

A rear spoiler 7 constitutes an integral part of the rear glass plate G, and forms a protrusion 8 projecting outwardly and extending widthwise. In other words, the rear glass plate G is formed with the protrusion 8 so as to protrude locally, and the protrusion 8 serves as a rear spoiler to control airflow for purposes such as reducing lift acting on the rear of the vehicle.

As shown in FIGS. 3A and 3B, unlike a conventional rear glass plate, as indicated by a phantom line, which is formed in a flat or gently curved surface with a substantially constant radius of curvature, the rear glass plate G according to the present invention has the protrusion 8 locally protruding from the flat or gently curved surface, at an upper end area or an area near the upper end of the rear glass plate G. In the present embodiment, the protrusion 8 is formed, as shown in FIG. 3A, with a top surface 9 facing upward, and a rear surface 10 facing toward the rearward of the vehicle.

As is evident from FIG. 3A, the top surface 9 is slightly inclined from a front end thereof downward with respect to the horizontal, while the rear surface 10 is slightly inclined from an upper end thereof rearward with respect to the vertical. However, depending upon circumstances, the top surface 9 may be horizontal or slightly inclined from the front end upward with respect to the horizontal, and the rear surface 10 may be vertical or slightly inclined from the upper end frontward with respect to the vertical. Thus, the angles of inclination of the top surface 9 and the rear surface 10 may be determined as appropriate.

Specifically, the top surface 9 is comprised of a first top surface 9a descending gradually from a position near the upper end of the rear glass plate G, and a second top surface 9b descending from an lower end of the first top surface 9a at a predetermined depression angle greater than that formed by the first top surface 9a. Similarly, the rear surface 10 is comprised of a first rear surface 10a ascending gradually from a predetermined position lower than the top surface 9 on the rear glass plate G, and a second rear surface 10b ascending from a front end of the first rear surface 10a at a predetermined elevation angle greater than that formed by the first rear surface 10a. The first top surface 9a, second upper surface 9b, first rear surface 10a, and second rear surface 10b are each formed in a flat surface or a gently curved surface with a substantially constant radius of curvature.

Each of sideways (widthwise-faced) ends of the protrusion 8 is also comprised, as shown in FIG. 3B, of a first side surface 11a ascending gradually from a position near a right or left side of the rear glass plate G sidewise, and a second side surface 11b ascending from an inner end of the first side surface 11a sidewise at a predetermined elevation angle greater than that formed by the first side surface 11a to join with the second top surface 9b. The first side surface 11a and second side surface 11b are each formed in a flat surface or a gently curved surface with a substantially constant radius of curvature.

As shown in FIGS. 1, 2A, etc., the first top surface 9a, right and left first side surfaces 11a, and first rear surface 10a smoothly join together with each other, forming a rectangularly looped endless belt of the skirts of the protrusion 8 rising from a smooth surface of the rear glass plate G. The first top surface 9a, right and left first side surfaces 11b, and second rear surface 10b are formed as an inner portion in such a manner as to further protrude toward outward of the vehicle from inner edges of the looped endless belt. On the borders between the belt of first top surface 9a, right and left first side surfaces 11a and first rear surface 10a, and the inner portion of second top surface 9b, right and left second side surfaces 11b and second rear top surface 10b, no great shift takes place in the radius of curvature.

Another exemplified embodiment of the protrusion 8, though not illustrated, may be provided as a winglike spoiler, which includes a top surface facing upward and a bottom surface facing downward, and which protrudes toward the rearward of the vehicle, formed with consideration given to the molding shape of the rear glass plate G.

The protrusion 8 may be formed, as yet another exemplified embodiment, of solid glass, i.e., an entire portion that juts out above a portion indicated by the phantom line in FIGS. 3A and 3B may be made of glass. However, in the present embodiment, the rear glass plate G having a substantially uniform thickness is shaped to form the protrusion 8, so as to provide space at an inner side of the vehicle as a recess (depression 12), in which is provided a brake lamp (high-mounted stop lamp 13). The high-mounted stop lamp 13 may be provided as in the present embodiment so that part of the high-mounted stop lamp 13 is included in the depression 12, or may be provided so that an entire body of the high-mounted stop lamp 13 is included in the depression 12.

The high-mounted stop lamp 13, for example as shown in FIG. 3A, includes a red lens element 14 so positioned as to face the second rear surface 10b, a light-emitting diode (LED) 15, a housing 16 accommodating these components 14 and 15, and the like, and fixed at the rear glass plate G in the depression 12 of the rear spoiler 7 utilizing a method known in the art.

According to the above-described embodiment of the rear spoiler 7, which is part of the rear glass plate G protruding toward outside of the vehicle and extending widthwise, the rear spoiler 7 is formed in one piece with the vehicle. Accordingly, unlike a conventional structure in which a rear spoiler is separately mounted, the present rear spoiler structure as described above requires no reinforcement for preventing a rear spoiler from loosening and rattling, which serves to reduce the number of process steps (and thus man-hours) for mounting the rear spoiler. Moreover, the rear spoiler 7 is integrally formed with the rear glass plate G, and therefore provided with no clearance at its mount position; consequently, a flush-surfaced external face of the vehicle is achieved and outward appearance thereof is beautifully improved.

Further, since the protrusion 8 that constitutes the rear spoiler 7 is formed at an upper end of the rear glass plate G, airflow that has been straightened out by the rear spoiler 7 may be supplied along the external face of the rear glass plate G, as shown in FIG. 6. Accordingly, raindrops, dust, or the like, which would otherwise be stuck on the external face of the rear glass plate G, can be removed, and thus visibility through the rear glass plate G from the driver's seat can be kept excellent.

Furthermore, the rear spoiler 7, the inside of which is formed with the depression 12 in which a brake lamp is attached, needs no electric wiring through the rear glass plate G, thus facilitating the wiring task and requiring no weathertight seal structure. Moreover, provision of the brake lamp in the depression serves to restrict a projection toward the inside of the vehicle; in consequence, a projection of an interior lining 25 toward in-vehicle space may be restricted, and the in-vehicle space may be effectively used.

Next, widthwise-faced ends of the protrusion 8 (the aforementioned first side surface 11a and second side surface 11b) extending toward rearward of the vehicle are inclined inwardly widthwise in the present embodiment. FIG. 5 shows such a variation of the protrusion 8, in which side surfaces 21 of a protrusion 8' is perpendicular to the rear glass plate G (not shown in FIG. 5). The length L5 of the rear side extending in a widthwise direction of the projection 8' is shorter than the length L4 of the front side, so that the side surfaces 21 extending toward the rearward of the vehicle are inclined inwardly widthwise.

According to this structure, airflow W1 passing along the widthwise-faced ends of the protrusion 8' is guided toward the center of the vehicle by the side surfaces 21. Consequently, wind noise caused at the widthwise-faced ends can be restricted, and optimum airflow that is brought together and flows toward the rearward of the vehicle can be generated, thus reducing drag acting on the vehicle.

Since the protrusion 8' has the side surfaces 21 and the top surface 22 perpendicular to each other, the airflow W1 could disadvantageously interfere with airflow W2 that has passed along the top surface 22, in a position rearward the widthwise-faced ends.

In contrast, according to the protrusion 8 as shown in FIG. 4, in which the second side surfaces 11b are inclined inwardly widthwise as shown in FIG. 3B, the second side surface 11b and the second top surface 9b form an obtuse angle with each other, and thus interference between the airflow W1 flowing along the second side surface 11b and the airflow W2 flowing along the second top surface 9b is reduced, so that airflow without disturbance can be supplied toward the rearward of the vehicle.

The protrusion 8 is, as shown in FIG. 4, a distance L2 between right and left rear ends of bottom sides 11c of the second side surfaces 11b is shorter than a distance L1 between right and left front ends thereof, while a distance L3 between right and left rear ends of top sides 11d of the second side surfaces 11b is also shorter than the distance L1. Accordingly, the second side surfaces 11b (widthwise-faced ends of the protrusion 8) extending toward the rearward of the vehicle are inclined inwardly widthwise. Therefore, wind noise at the widthwise-faced ends of the protrusion 8 can be restricted, optimum airflow that is brought together and flows toward the rearward of the vehicle can be generated, and drag acting on the vehicle can be reduced.

Further, the bottom side 11c and the top side 11d of each second side surface 11b are not parallel to each other, but the top side 11d extending toward the rearward of the vehicle is inclined inwardly widthwise at a greater tilt angle than the bottom side 11c. To be more specific, the second side surfaces 11b broaden toward the rearward of the vehicle. Accordingly, airflow flowing along the second side surfaces 11b spreads out more as it flows rearward, thereby further getting straightened. Similarly, the first side surfaces 11a also broaden toward the rearward of the vehicle, and airflow along the first side surfaces thus further gets straightened as well.

Although the preferred embodiments of the present invention have been described above, it is to be understood that layouts, shapes, numbers, and the like of each component are not limited to those of the embodiments described above and illustrated in the drawings. For example, the protrusion may be separated into a plurality of portions widthwise, and/or another row of the protrusions may be provided tandem. Otherwise, various modifications and changes may be made in the present invention without departing from the spirit and scope thereof.

The present invention exerts the following advantageous effects:

(1) When the rear spoiler is part of a rear glass plate provided at the rear deck of the vehicle, and is comprised of a protrusion that protrudes toward an outward of the vehicle and extends widthwise in one aspect of the present invention, this rear spoiler structure needs no reinforcement for preventing the rear spoiler from loosening and rattling, and thus serves to reduce the number of process steps (as well as man-hours) for mounting the rear spoiler. Moreover, a flush-surfaced external face of the vehicle is achieved and outward appearance thereof is beautifully improved.

(2) When the above rear spoiler is provided with a depression inside the vehicle, and the depression accommodates a brake lamp in another aspect of the present invention, this rear spoiler structure requires no electric wiring through the rear glass plate, thus facilitating the wiring task and requiring no weathertight seal structure. Since the brake lamp is provided in the depression, in-vehicle space can be effectively utilized.

(3) When the above protrusion is formed at an upper end of the rear glass plate in yet another aspect of the present invention, this rear spoiler structure allows airflow that has passed and got straightened out to be supplied along an external face of the rear glass plate, and can thus effectively remove raindrops, dust, or the like, which would otherwise be stuck on the external face of the rear glass plate. Consequently, visibility through the rear glass plate from the driver's seat may be kept excellent.

(4) When a widthwise-faced end of the above protrusion extending toward rearward of the vehicle is inclined inwardly widthwise, in yet another aspect of the present invention, this rear spoiler structure serves to restrict wind noise at the widthwise-faced end, and to generate optimum airflow that is brought together and flows toward the rearward of the vehicle, thus reducing drag acting on the vehicle.

What is claimed is:

1. A rear spoiler structure for a vehicle in which a rear spoiler is provided at a rear deck of the vehicle, wherein the rear spoiler is part of a rear glass plate provided at the rear deck of the vehicle, and is comprised of a protrusion that protrudes toward an outward of the vehicle and extends widthwise.

2. A rear spoiler structure for a vehicle according to claim 1, wherein the rear spoiler is provided with a depression inside the vehicle; and wherein the depression accommodates a brake lamp.

3. A rear spoiler structure for a vehicle according to claim 1, wherein the protrusion is formed at an upper end of the rear glass plate.

4. A rear spoiler structure for a vehicle according to claim 1, wherein a widthwise-faced end of the protrusion extending toward rearward of the vehicle is inclined inwardly widthwise.

* * * * *